(12) United States Patent
Petrosky et al.

(10) Patent No.: US 8,938,044 B2
(45) Date of Patent: Jan. 20, 2015

(54) TUBESHEET WALKER FOR HEAT EXCHANGER INSPECTIONS

(71) Applicant: Westinghouse Electric Company LLC, Cranberry Township, PA (US)

(72) Inventors: Lyman J. Petrosky, Latrobe, PA (US); Phillip J. Hawkins, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 65 days.

(21) Appl. No.: 13/775,354

(22) Filed: Feb. 25, 2013

(65) Prior Publication Data

US 2013/0299122 A1 Nov. 14, 2013

Related U.S. Application Data

(60) Provisional application No. 61/645,220, filed on May 10, 2012.

(51) Int. Cl.
*G21C 17/00* (2006.01)
*F22B 37/00* (2006.01)
(Continued)

(52) U.S. Cl.
CPC ............ *F22B 37/006* (2013.01); *G21C 17/017* (2013.01); *F22B 37/483* (2013.01)
USPC ............ 376/249; 376/260; 165/11.2; 165/76; 122/379

(58) Field of Classification Search
CPC .... F22B 37/002; F22B 37/003; F22B 37/005; F22B 37/006; G21C 17/017
USPC .............. 414/146, 150, 154, 186, 191, 749.4, 414/751.1, 804; 122/379, 381, 383, 390; 134/167 R, 172, 180; 318/568.11–568.25; 73/865.8
See application file for complete search history.

(56) References Cited

U.S. PATENT DOCUMENTS

| 4,168,782 A | | 9/1979 | Sturges, Jr. |
| 4,216,893 A | * | 8/1980 | Glatthorn ........................ 228/45 |
| 4,303,368 A | * | 12/1981 | Dent et al. .................... 414/590 |

(Continued)

FOREIGN PATENT DOCUMENTS

| FR | 2626515 | * | 2/1988 | .............. F22B 37/00 |
| FR | 2626515 A1 | | 8/1989 | |
| JP | 2003-53288 A | | 2/2003 | |

OTHER PUBLICATIONS

English Translation of FR2626515 (Bernardin et al.).
(Continued)

*Primary Examiner* — Saul Rodriguez
*Assistant Examiner* — Ronald Jarrett
(74) *Attorney, Agent, or Firm* — Richard J. Coldren; Westinghouse Electric Company LLC

(57) ABSTRACT

A robotic tubesheet walker having two rails connected by a central hinge, wherein the central hinge can be opened or closed by an actuation device. Upon each rail is mounted a carriage, wherein each carriage can move along its respective rail toward or away from the central hinge by means of a drive mechanism. Each carriage further contains at least two "gripper" attachment mechanisms, such as camlocks, to grip the tubesheet. The grippers either insert into tube holes within the tubesheet to fasten the respective carriage to the tubesheet, or retract to disengage. Further attached to the central hinge is a tool support fixture, and attached to the tool support fixture is a coupler that holds maintenance or inspection tools.

14 Claims, 3 Drawing Sheets

(51) Int. Cl.
*G21C 17/017* (2006.01)
*F22B 37/48* (2006.01)

(56) References Cited

U.S. PATENT DOCUMENTS

| | | | |
|---|---|---|---|
| 4,476,368 A | * | 10/1984 | Cammann et al. ........... 219/69.2 |
| 5,355,063 A | | 10/1994 | Boone et al. |
| 5,611,948 A | | 3/1997 | Hawkins |
| 7,314,343 B2 | | 1/2008 | Hawkins et al. |

OTHER PUBLICATIONS

English Translation of JP2003-53288 (Ikeda).
International Search Report for PCT/US2013/034210 dated Jan. 8, 2014 (Form PCT/ISA/210).
Written Opinion of the International Searching Authority for PCT/US2013/034210 dated Jan. 8, 2014 (Form PCT/ISA/237).

* cited by examiner

TUBESHEET WALKER FOR HEAT EXCHANGER INSPECTIONS

CROSS-REFERENCE TO RELATED APPLICATIONS

This application claims priority under 35 U.S.C. §119(e) from U.S. Provisional Application No. 61/645,220, entitled "Tubesheet Walker for Heat Exchanger Inspections," filed on May 10, 2012, the disclosure of which is incorporated herein by reference.

BACKGROUND

1. Field

The present invention relates to robotic systems, and in particular to a robot for servicing the heat exchanger tubes in the steam generators of a nuclear power plant.

2. Description of the Related Art

In a pressurized water nuclear-powered electric generating system, the heat generated by the nuclear reaction is absorbed by a primary coolant that circulates through the reactor core and is used to generate steam in a steam generator. The steam generator typically is an upright cylindrical pressure vessel with hemispherical end sections. A traverse plate called a tubesheet, located at the lower end of the cylindrical section, divides the steam generator into a primary side, which is the lower hemispherical section below the tubesheet and the inside of U-shaped tubes which extend into the cylindrical section from the underside of the tubesheet, and a secondary side, which is located above the tubesheet around the outside of the tubes. A vertical wall bisects the primary side into an inlet section and an outlet section. The tubesheet is a thick carbon steel plate with an array of holes, into which the ends of U-shaped tubes are inserted. The number of tubes in a steam generator tubesheet range from about 4,000 to 15,000. One end of each U-shaped tube is inserted into a hole within the tubesheet that communicates with the inlet section of the primary side, and the other end is inserted into a hole within the tubesheet that communicates with the outlet section. The primary coolant is introduced under pressure into the inlet section of the primary side, circulates through the U-shaped tubes, and exits through the outlet section. Water introduced into the secondary side of the steam generator circulates around the U-shaped tubes and is transformed into steam by heat transferred from the primary coolant. The steam is then used to perform useful mechanical work, such as to operate a turbine-driven electric generator.

Degradation of the tubes may occur during operation of the steam generator. This degradation is undesirable, among other reasons, because the primary coolant is radioactive, so any leakage of the coolant into the secondary side of the generator contaminates the steam that contacts the turbine. It is generally not practical to replace degraded tubing. Instead, the steam generator is periodically inspected, and the affected tubes are either repaired or plugged at both ends. In view of the thousands of tubes in the steam generator, plugging a few tubes does not appreciably impact the efficiency of heat transfer.

Because of the radiation hazard present in steam generators used in a nuclear-powered facility, the heat exchanger tubes of such steam generators must be, for the most part, remotely serviced to avoid exposing maintenance personnel to potentially harmful radiation. Consequently, a number of robotic systems have been developed for remotely performing repair and maintenance operations on these heat exchanger tubes. These robotic systems typically include some sort of robotic delivery arm in combination with any one of a number of specialized tools designed to be carried by the robotic arm.

Servicing of nuclear steam generators has changed dramatically in the last twenty years. In the past, much of the older steam generator tubing became degraded and required significant plugging, sleeving, or total steam generator replacement. Power plant service outages were of long duration and the repairs to steam generators required sophisticated robotic manipulators and tooling with the capability to perform varied inspections and repairs while avoiding plugged tubes.

Presently, most utilities in the industry have either replaced their steam generators or have generators with few plugged tubes that require minimal repair. Most of the work for the steam generator tubing involves eddy current inspection with few or no plugs required. Outage time for plant maintenance and refueling, which dictates the length of the outage, has been reduced, significantly decreasing the time allotted for steam generator inspection and service. There is a clear need to improve upon existing robotic systems for servicing steam generators to meet modern maintenance timetables. Current maintenance robots are generally heavy (over 100 lbs.) and highly sophisticated, which requires more time and personnel radiation exposure for transportation, set up, and installation. Current robots are also too large to install multiple units on a given section of most steam generator channel heads.

Additionally, steam generator robotics generally have three or more degrees of freedom along with multiple motors with position feedback. The control systems, along with the complexity of the robots, are generally expensive to purchase and maintain. Furthermore, most robots, when installed in the steam generator, are anchored in place and must be moved to gain access to all the tubes during inspection.

Most tubesheet walker robots, such as the present invention, use the holes in the tubesheet to anchor the robot with a number of grippers, such as camlocks. These robots use two sets of camlocks, alternating gripping with one set and moving the other set to a new location, thereby propelling the robot across the tubesheet. A typical robot of this design is described in U.S. Pat. No. 7,314,343, entitled "Miniature Manipulator for Servicing the Interior of Nuclear Steam Generator Tubes." The referenced design uses an "X" layout consisting of a base member that holds process specific tooling, a central rotary joint, and a linear sliding joint. In addition, there is a small amount of vertical movement in the center joint to move the robot up toward the tubesheet when necessary. The problem with the referenced design is that the mechanism is relatively complex, with many intricate parts. Also, movement can only be effected in one direction at a time, so the robot must execute multiple actions to move in any direction other than its current orientation.

As a result of the current state of the art, a simple, small, light-weight robot is desired that can facilitate tube inspection for a heat exchanger.

SUMMARY

The present invention is an improved robotic tubesheet walker for heat exchanger inspections and maintenance. It has numerous advantages over known robots in the art: it is relatively easy to maintain, inexpensive to fabricate, travels quickly along the tubesheet, and is small and lightweight.

In one embodiment, the robot has two rails connected by a central hinge, wherein the central hinge can be opened or closed by an actuation device. Upon each rail is mounted a carriage, wherein each carriage can move along its respective rail toward or away from the central hinge by means of a drive mechanism. Each carriage further contains at least two "gripper" attachment mechanisms, such as camlocks. The grippers either insert into tube holes to fasten the robot to the tubesheet, or retract to disengage. Also attached to the central hinge is a tool support fixture, and attached to the tool support fixture is a coupler that holds maintenance or inspection tools.

These and other objects, features, and characteristics of the present invention, as well as the methods of operation and functions of the related elements of structure and the combination of parts, will become more apparent upon consideration of the following description and the appended claims with reference to the accompanying drawings, all of which form a part of this specification wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DESCRIPTION OF THE EXEMPLARY EMBODIMENTS

Figure 1:
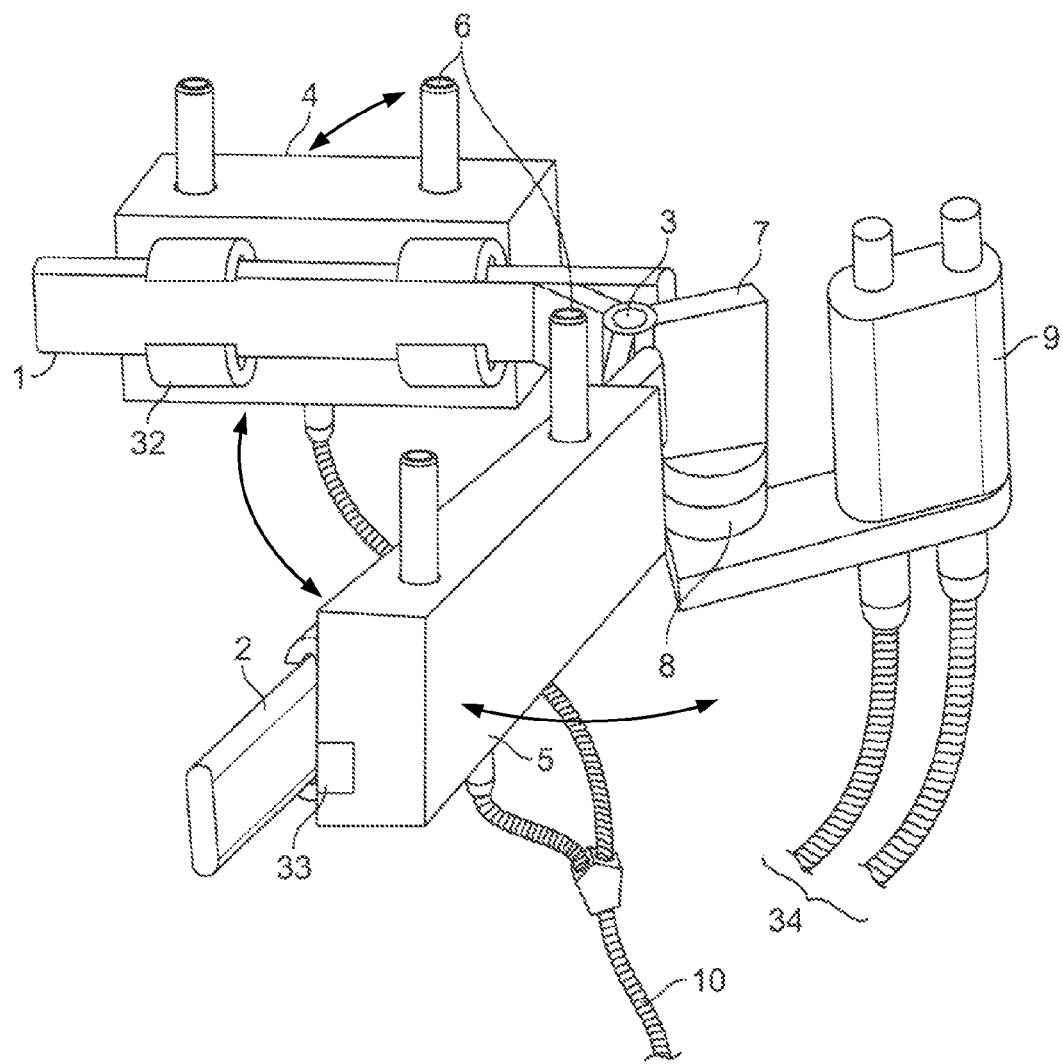
FIG. 1 is a schematic diagram of one exemplary embodiment of the manipulator of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

FIG. 1 is a schematic diagram of an improved robotic tubesheet walker according to one exemplary embodiment of the present invention. As described in greater detail below, the present invention improves upon the prior art by being easier to maintain, less expensive to fabricate, able to travel quickly along the tubesheet, and relatively small and lightweight.

The robotic tubesheet walker includes two rails, 1 and 2, coupled to a central hinge 3. Carriage 4 is mounted upon rail 1, and carriage 5 is mounted upon rail 2. Each carriage may be connected to its respective rail using, as a non-limiting example, a C-shaped slide bearing 32 restricting motion of the carriage in any direction other than along the length of the rail. Carriages 4 and 5 contain at least two "grippers" 6 that engage the tubesheet to hold the robot in place. Attached to the central hinge 3 is a tool support fixture 7. A coupler 8 is attached to tool support fixture 7, the coupler being designed to hold a variety of analytical or maintenance tools 9. Such tools may comprise, for example, an eddy current probe guidetube or a plugging tool. The conduits 34 shown in FIG. 1 are probe delivery tubes.

Each gripper 6 can insert into a hole in the tubesheet and expand gripper fingers to hold the corresponding carriage in place. Alternatively, each gripper 6 can retract from the hole to disengage the corresponding carriage from the tubesheet. In one embodiment, the grippers are camlocks as disclosed in U.S. Pat. No. 7,314,343. The grippers 6 can be operated remotely through the cabling 10. In another embodiment the grippers on a carriage may operate as a pair.

The central hinge 3 is movable through an actuation device, such as a servo motor or pneumatic actuator, which opens or closes the central hinge. The actuation device may also be remotely operated through the cabling 10. In one embodiment, the tool support structure 7 engages the central hinge 3 in such a way that it is always positioned at one-half the angle between the first rail 1 and second rail 2.

The carriages 4 and 5 are individually translatable by means of drive mechanisms that allow the carriages to move along their respective rails. The drive mechanism may be, for example, a linear drive motor or a rotary motor that rotates a drive pinion gear that is operatively connected to a rack of teeth that substantially spans the length of the corresponding rail. Other drive mechanisms, such as screw or belt drives, may alternatively be used to propel the carriages either toward or away from the central hinge along the corresponding rails. The carriage drive mechanisms are also remotely operable through the cabling 10.

The present invention further includes position readouts (such as encoder 33) of each carriage and the central hinge such that a remote operator may know the alignment of the carriages and central hinge relative to the tubesheet in order to properly position and move the present invention along the tubesheet. The remote operation of the various mechanisms of the robot of this embodiment is controlled through cable 10.

Figure 2:
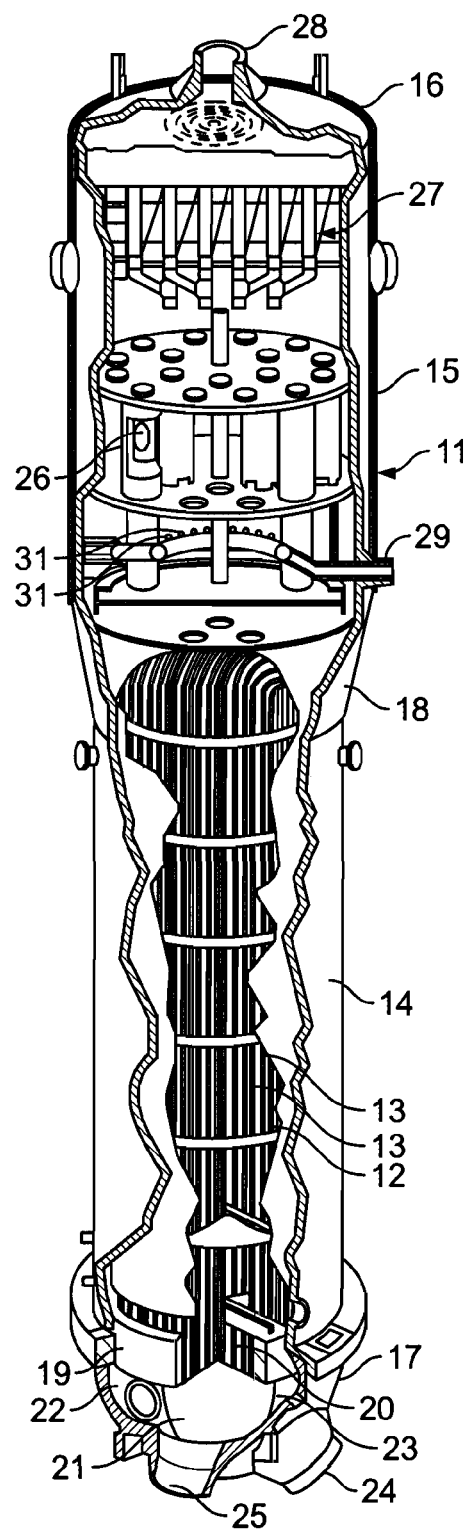
FIG. 2 is a perspective view, partially cut away, of an exemplary vertical tube and shell steam generator.

FIG. 2 shows an exemplary steam generator 11 that utilizes a plurality of U-shaped tubes 13 which form a tube bundle 12 to provide the heating surface required to transfer heat from a primary fluid, such as the reactor coolant, to vaporize or boil a secondary fluid, such as water. The steam generator 11 comprises a vessel having a vertically oriented tubular shell portion 14 and a top enclosure or dished head 16 enclosing the upper end and a generally hemispherical-shaped channel head 17 enclosing the lower end. The lower shell portion 14 is smaller in diameter than the upper shell portion 15 and a frustoconical-shaped transition 18 connects the upper and lower portions. A tube sheet 19 is attached to the channel head 17 and has a plurality of holes 20 disposed therein to receive ends of the U-shaped tubes 13. A dividing plate 21 is centrally disposed within the channel head 17 to divide the channel head into two compartments 22 and 23, which serve as headers for the tube bundle 12. Compartment 23 is the primary fluid inlet compartment and has a primary fluid inlet nozzle 24 in fluid communication therewith. Compartment 22 is the primary fluid outlet compartment and has a primary fluid outlet nozzle 25 in fluid communication therewith. The primary fluid is caused to flow through the tube bundle 12 and out through outlet nozzle 25.

The feedwater inlet structure that introduces the secondary fluid into the generator includes a feedwater inlet nozzle 29 having a generally horizontal portion called feedring 30 and discharge nozzles 31 elevated above the feedring. Feedwater, which is supplied through the feedwater inlet nozzle 29, passes through the feedwater ring 30, and exits through discharge nozzle 31 and, in one prior art embodiment, mixes with water which was separated from the steam and is being recirculated flowing down an annulus outside of the tube bundle. The water then enters the tube bundle 12 from just above the tube sheet and flows among and up the tube bundle where it is heated to generate steam. After flowing through a primary centrifugal separator 26, the steam passes through a secondary separator 27 before reaching a steam outlet nozzle 28 centrally disposed in the dished head 16.

Figure 3:
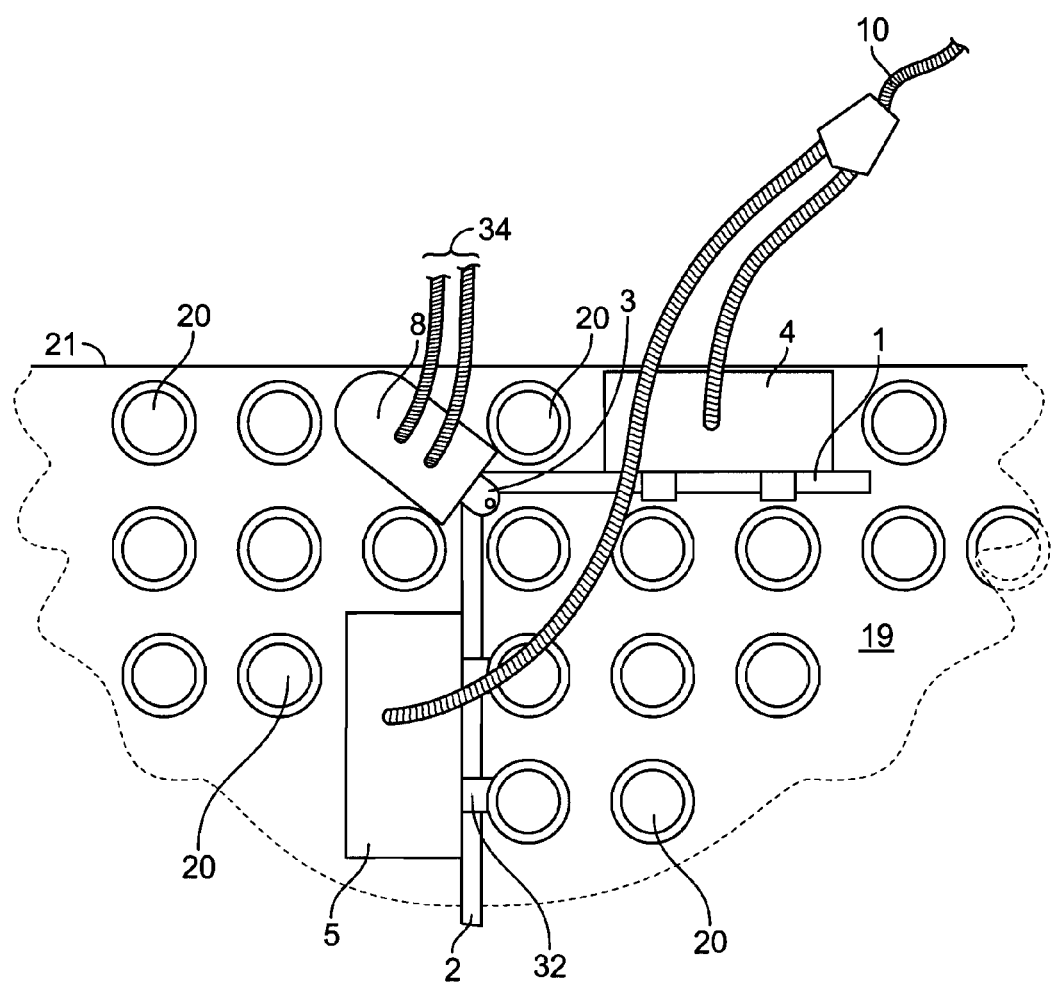
FIG. 3 is a simplified schematic of an exemplary portion of a hemispherical section of a tubesheet with the manipulator described hereafter supported therefrom.

FIG. 3 is a simplified schematic of a tubesheet 19 as shown in FIG. 2. The underside of the manipulator described above in FIG. 1 is shown in one exemplary position on the tubesheet, wherein the grippers in both carriages have been extended within tubes (hidden from view) to anchor the tubesheet walker to the tubesheet.

In one mode of operation of the present invention, the central hinge 3 is set at an angle greater than zero that aligns the two rails with preselected rows of tubes on the tubesheet such that the grippers on the carriages may engage tube holes along their respective tube rows. The rows are selected to map a path to place the tool support fixture 7 over the tube that is to be serviced. Using the grippers, one carriage grips the tubesheet while the other carriage disengages and is moved along its corresponding rail. Alternatively, the carriage that grips the tubes can be moved along its rail to move the other carriage that is disengaged from the tubes along an orientation of the rail associated with the carriage gripping the tubes. Through this mode of operation it is possible to move and align a tool, the carriage with retracted grippers, or both with a particular tube or row of tubes. Upon achieving a desired position, the carriage with retracted grippers can extend its grippers to engage the tubesheet, and the first attached carriage can be disengaged by retracting its corresponding grippers and moving to a new position. By alternating carriage engagements and movements along the rails, the robot is thus able to "walk" on the tubesheet to deliver a tool to a desired tubesheet location. Furthermore, by selecting which carriage grips the tubesheet and by opening or closing the central hinge, the orientation and movement of the tubesheet walker can be changed to any desired direction, clockwise or counterclockwise, in a plane parallel to the tubesheet.

In addition to the basic mode of operation described above, the robot can close its central hinge to align the carriages in the same direction, thereby permitting the carriages to engage two parallel rows of tubes through grippers. In this mode of operation, it is possible to translate the robot quickly by alternating slide movements and gripper attachments of the carriages without opening the central hinge. For instance, if the first carriage attaches to the tubesheet using grippers, then the second carriage can either translate toward or away from the central hinge along its respective rail. The second carriage can then attach to the tubesheet using grippers, and the first carriage can detach from the tubesheet by retracting its grippers. The first carriage can then translate toward or away from the central hinge to reposition its grippers for attachment to the tubesheet. Through this mode of operation, the tubesheet walker is able to quickly move either forward or backward along the direction of the two rails.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A robotic tubesheet walker for heat exchanger inspections and maintenance comprising:
    a) a first rail and a second rail;
    b) a central hinge connecting the first rail to the second rail, the central hinge being configured such that one or both of the first rail or the second rail rotates at least partially about the central hinge upon a command from a remote location;
    c) a first carriage and a second carriage, the first carriage being mounted to and configured to move along the first rail and the second carriage being mounted to and configured to move along the second rail, each such movement being remotely actuated upon a command from the remote location;
    d) a first attachment mechanism on the first carriage is remotely actuated upon a command from the remote location to fasten the first carriage to a surface of a tubesheet;
    e) a second attachment mechanism on the second carriage is remotely actuated upon a command from the remote location to fasten the second carriage to a surface of the tubesheet;
    f) a tool support fixture connected to the robotic tubesheet walker; and
    g) wherein the robotic tubesheet walker is solely supported from the tubesheet as it moves across at least several rows of tubes extending through the tubesheet.

2. The robotic tubesheet walker as in claim 1, wherein the first carriage is slidably mounted upon the first rail and the second carriage is slidably mounted upon the second rail.

3. The robotic tubesheet walker as in claim 2 further comprising a first drive mechanism connected to the first carriage and the first rail such that the first carriage can slide toward or away from the central hinge along the first rail under the power of the first drive mechanism.

4. The robotic tubesheet walker as in claim 3 further comprising a second drive mechanism connected to the second carriage and the second rail such that the second carriage can slide toward or away from the central hinge along the second rail under the power of the second drive mechanism.

5. The robotic tubesheet walker as in claim 1, wherein the first rail and the second rail rotate around the central hinge with a relative angle between the first rail and the second rail in the range of 0 to 180 degrees.

6. The robotic tubesheet walker as in claim 1, wherein the tool support fixture laterally extends from the central hinge, in a plane in which the first rail and second rail extend, and the tool support fixture is connected to the central hinge at an angular displacement of half the relative angle between the first rail and the second rail, and wherein the tool support fixture maintains the angular displacement as an angle between the first rail and the second rail changes.

7. The robotic tubesheet walker as in claim 1, wherein the first and second attachment mechanisms are grippers.

8. The robotic tubesheet walker as in claim 7, wherein the grippers are remotely moveable fingers.

9. The robotic tubesheet walker as in claim 7, wherein the grippers are camlocks.

10. The robotic tubesheet walker as in claim 1, wherein the tool support fixture is connected to the central hinge.

11. A method of operating the robotic tubesheet walker of claim 1, comprising engaging the first carriage to the tubesheet through the first attachment mechanism while the second carriage is disengaged from the tubesheet and either moves the second carriage along the second rail to a first desired location or moves the first carriage along the first rail to move the second carriage to the first desired location, wherein the second carriage then engages the tubesheet through the second attachment mechanism while the first carriage disengages the first attachment mechanism and either moves the first carriage along the first rail to a second desired location or moves the second carriage along the second rail to move die first carriage to the second desired location.

12. A method of selecting the orientation of the robotic tubesheet walker of claim 1 in a plane parallel to the tubesheet, comprising engaging the first carriage to the tubesheet through the first attachment mechanism white the second attachment mechanism in the second carriage is disengaged from the tubesheet and rotating the second carriage about the central hinge.

13. A method of selecting the orientation of the robotic tubesheet walker of claim 1 in a plane parallel to the tubesheet, comprising engaging the second carriage to the tubesheet through the second attachment mechanism while the first attachment mechanism in the first carriage is retracted and rotating the first carriage about the central hinge.

14. A method of operating the robotic tubesheet walker of claim 1, comprising rotating the central hinge such that the first rail and the second rail are substantially parallel, wherein the first carriage engages the tubesheet through the first attachment mechanism while either the second carriage repositions along the second rail or the first carriage repositions along the first rail to a first desired location, wherein the second carriage then engages the tubesheet through the second attachment mechanism while the first carriage is disengaged from the tubesheet and repositions to a second desired location.

* * * * *